(12) United States Patent
Corso

(10) Patent No.: US 6,360,628 B1
(45) Date of Patent: Mar. 26, 2002

(54) MOTORCYCLE CLUTCH LEVER CABLE COVER

(76) Inventor: Jerry Corso, 197 Old Foxon Rd., East Haven, CT (US) 06512

( * ) Notice: Subject to any disclaimer, the term of this patent is extended or adjusted under 35 U.S.C. 154(b) by 0 days.

(21) Appl. No.: 09/368,758

(22) Filed: Aug. 5, 1999

Related U.S. Application Data

(63) Continuation-in-part of application No. 09/172,505, filed on Oct. 14, 1998, now abandoned.

(51) Int. Cl.[7] ............................................. B62K 23/06
(52) U.S. Cl. ..................................... 74/502.2; 74/551.8
(58) Field of Search .................. 74/489, 502.2, 74/488, 551.8, 551.9; D12/179; 280/288.4, 304.3

(56) References Cited

U.S. PATENT DOCUMENTS

| | | | | |
|---|---|---|---|---|
| 2,829,534 A | * | 4/1958 | Buxton et al. ................. | 74/488 |
| 3,596,530 A | * | 8/1971 | Yoshigai .................... | 74/489 X |
| 3,915,028 A | * | 10/1975 | Kine ......................... | 74/489 X |
| 4,232,565 A | | 11/1980 | Leonheart .............. | 74/551.9 X |
| 4,461,189 A | | 7/1984 | Rottenkolber et al. ........ | 74/489 |
| D348,035 S | | 6/1994 | Brown et al. ............. | D12/179 |
| 5,325,737 A | | 7/1994 | Bendetti ..................... | 74/551.9 |
| 5,377,558 A | | 1/1995 | Harris ....................... | 74/551.8 |
| D376,340 S | | 12/1996 | Davidson et al. ....... | D12/179 X |
| D425,464 S | * | 5/2000 | Sands ........................ | D12/179 |

FOREIGN PATENT DOCUMENTS

| | | | | |
|---|---|---|---|---|
| GB | 756876 | 9/1956 | .................. | 74/488 |
| GB | 1389679 | 4/1975 | ................ | 74/551.8 |

* cited by examiner

*Primary Examiner*—Mary Ann Green
(74) *Attorney, Agent, or Firm*—DeLio & Peterson, LLC; Kelly M. Reynolds

(57) ABSTRACT

A control lever assembly comprises a cable housing having an outer surface, the outer surface containing an opening, e.g., a slot, for receiving a cable; a cable received within the housing; and a control lever, adjacent the housing, movable to actuate the cable. A cable cover extends from or is secured to the control lever. The cable cover is adapted to shield the opening in the surface of the housing and restrict view of the cable therein.

14 Claims, 3 Drawing Sheets

MOTORCYCLE CLUTCH LEVER CABLE COVER

This is a continuation-in-part of application Ser. No. 09/172,505 filed on Oct. 14, 1998 now abandoned.

BACKGROUND OF THE INVENTION

1. Field of the Invention

This invention relates to control lever assemblies and, in particular, to a cable cover useful for clutch levers on motorcycle handlebars.

2. Description of Related Art

In motorcycles or other wheeled vehicles which are steered by handlebars, for example, all terrain vehicles, clutch and brake mechanisms are typically actuated by levers mounted on the handlebars. For example, a typical Harley Davidson motorcycle has a clutch or brake lever assembly mounted on the handlebars of the type depicted in FIG. 1. A handlebar 48 connected to the steering assembly includes a housing 24 on an end thereof from which extends a handle or hand grip 22, which may also function as a rotatable throttle. A cable 30, and actuating the clutch or brake, is movably received within cable tube 40 which has an end piece 38 attached to housing 24. The cable continues within the upper portion of housing 32 and maybe inserted through slot 34 and opening 36 in the housing upper portion. A lever 20 is pivotally attached to housing 24 and may be squeezed downward by the rider's hand while grasping hand grip 22. Cable end 28 is received through opening 30 in housing 24 upper surface and connects to the underside of the lever 20 end 26 adjacent to the pivot point.

Because of the necessity to replace the clutch or brake cable, the housing upper surface includes openings 30 and 34. These openings have been found to be prone to collecting dirt and dust which may interfere with proper operation of the cable. Additionally, the opening is somewhat unsightly since the visible surfaces of many motorcycles are highly decorated. Various patent art in this area, for example, U.S. Pat. Nos. 4,232,565, 5,377,558, 4,461,189, 5,325,737, U.S. Design Pat. Nos. 376,340 and 348,035, and U.K. Patent No. 756,876 and 1,389,679, have addressed improvements in levers used for motorcycle brakes or clutches, but none have recognized or suggested solutions to the problems of the type described above.

Bearing in mind the problems and deficiencies of the prior art, it is therefore an object of the present invention to provide a cover for clutch or brake levers which provides protection to the clutch or brake cables attached thereto.

It is another object of the present invention to provide a cover for a clutch or brake lever which restricts the view of the cable attachment to the lever.

A further object of the invention is to provide a cover of the type described previously which provides access to the cables when desired.

It is yet another object of the present invention to provide a cable cover of the type described previously which may be readily retrofitted to existing clutch or brake levers.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a control lever assembly comprising a cable housing having an outer surface, the outer surface containing an opening, e.g., a slot, for receiving a cable; a cable received within the housing; and a control lever, adjacent the housing, movable to actuate the cable. A cable cover extends from or is secured to the control lever. The cable cover is adapted to shield the opening in the surface of the housing and restrict view of the cable therein.

The assembly may further include a handle extending from the housing, with the control lever being movable toward and away from the handle. Preferably, the control lever is movable between a first position wherein the cable cover shields the opening in the surface of the housing and restricts view of the cable therein and a second position wherein the cable cover is raised from the surface and permits access to the cable in the housing. The control lever may have a fulcrum adjacent the housing and the cable cover may be attached to the control lever adjacent the fulcrum. More preferably, the control lever has a fulcrum adjacent the housing, and a lever portion extending in one direction from the fulcrum and the cable cover extending in an opposite direction from the fulcrum.

The cable cover may be substantially planar and integrally made with the control lever, or adhered or fastened to the control lever.

In a related aspect, the present invention provides a method of protecting a control lever assembly. There is first provided a control lever assembly comprising a cable housing having an outer surface, the outer surface containing an opening for receiving a cable; a cable received within the housing; and a control lever, adjacent the housing, movable to actuate the cable. A cable cover is then secured to the control lever to shield the opening in the surface of the housing and restrict view of the cable therein. In operation, the control lever is movable between a first position wherein the cable cover shields the opening in the surface of the housing and restricts view of the cable therein and a second position wherein the cable cover is raised from the surface and permits access to the cable in the housing.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

Figure 1:
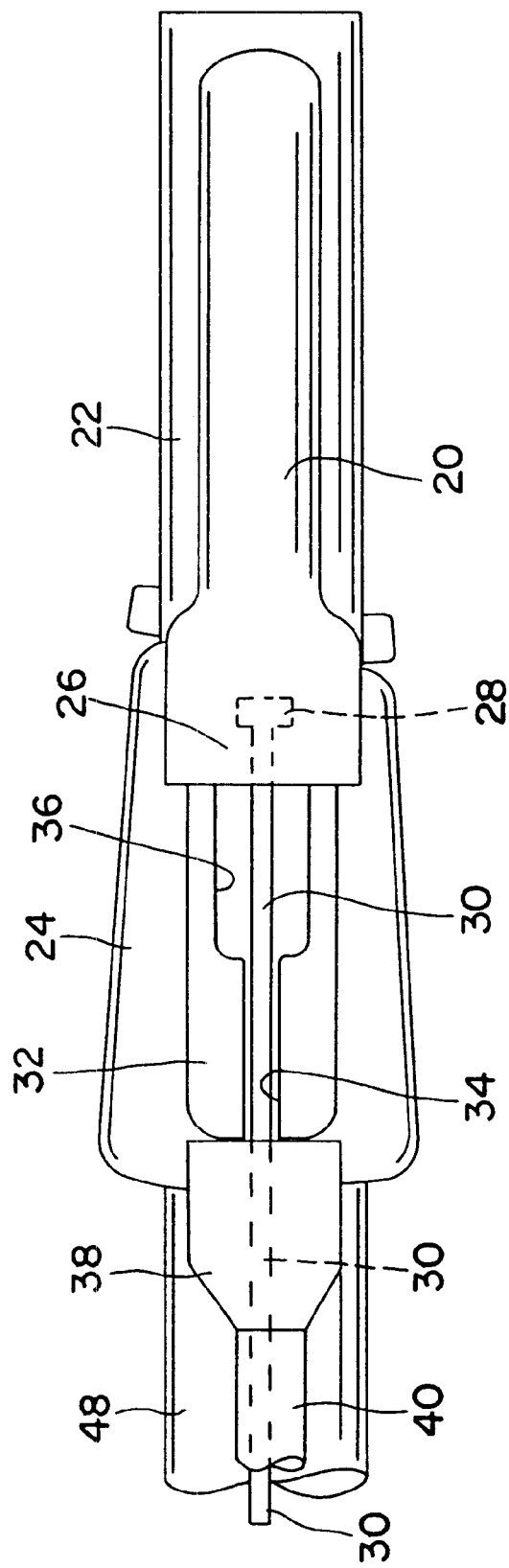
FIG. 1 is a top plan view of a control lever housing assembly of the prior art.

In describing the preferred embodiment of the present invention, reference will be made herein to FIGS. 1–3 of the drawings in which like numerals refer to like features of the invention. Features of the invention are not necessarily shown to scale in the drawings.

Figure 2:
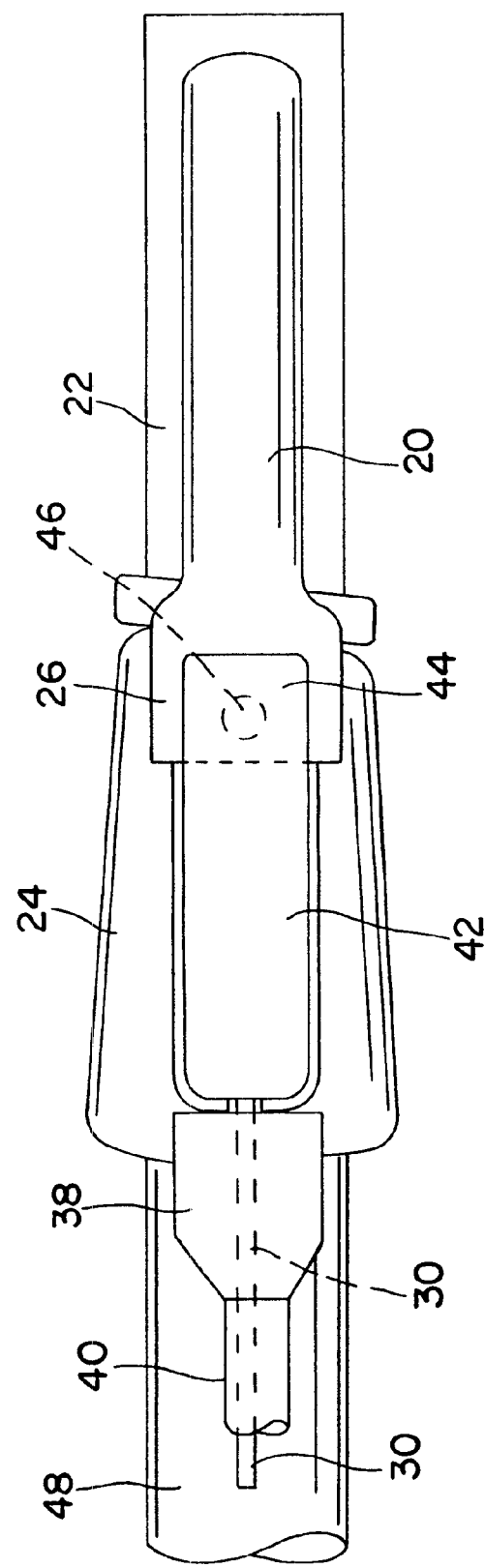
FIG. 2 is a top plan view of the control lever housing assembly of FIG. 1 incorporating the cover of the present invention.
Figure 3:
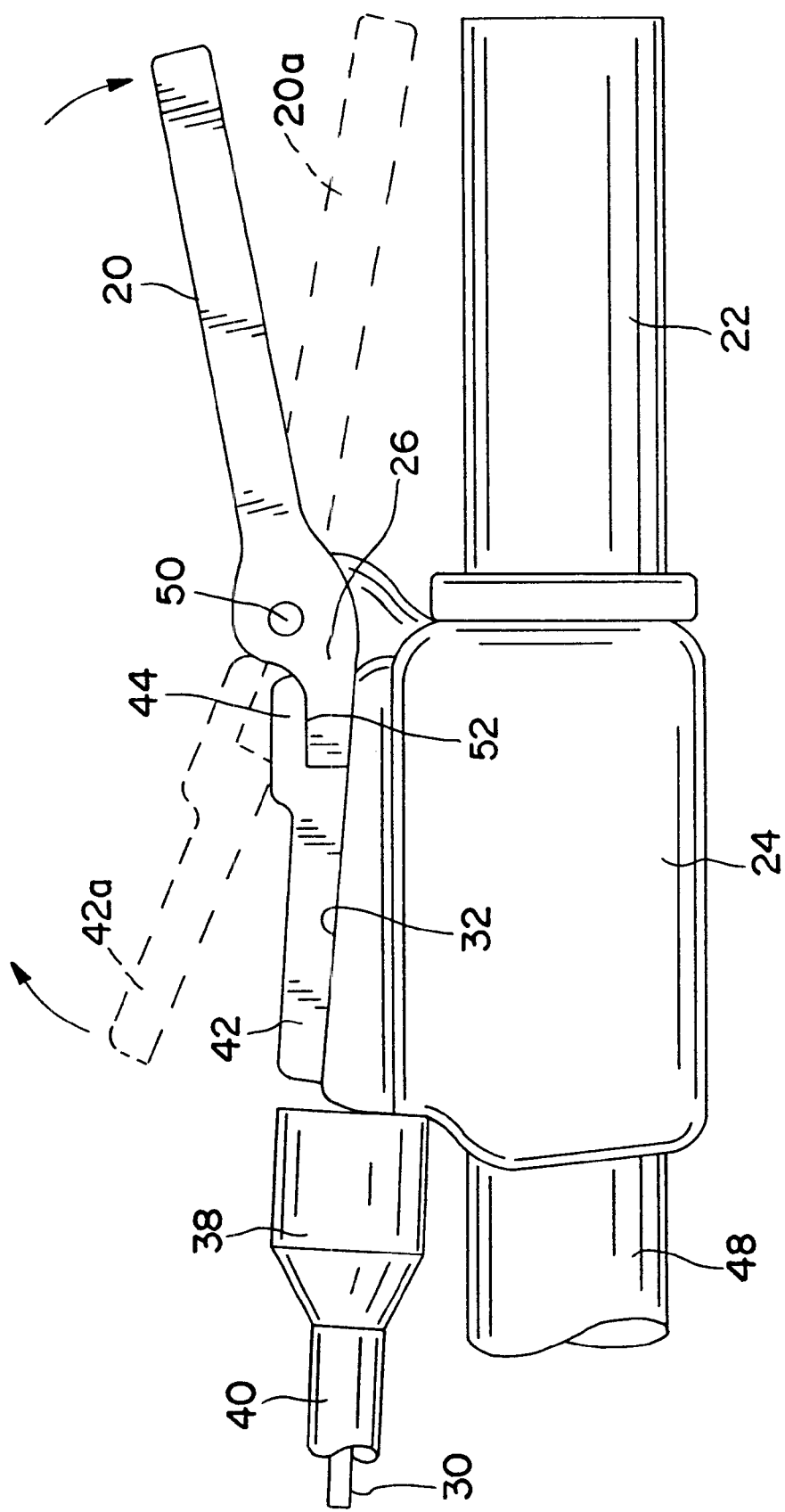
FIG. 3 is a side view of the control lever housing assembly of FIG. 2 incorporating the cover of the present invention

In order to protect the cable ends for brake or clutch lever assemblies, to shield the opening in the surface of the housing for receiving the cable and restrict view of the cable therein, the present invention provides a cable cover portion which extends from the control lever, and may be secured thereto, as depicted in its preferred embodiment in FIGS. 2 and 3. As previously discussed in connection with FIG. 1, a typical example of the present invention is shown in connection with a typical clutch lever assembly, although the invention is equally useful for brake lever assemblies. Housing 24 is secured to the end of handle bar 48 and has extending therefrom tubular hand grip 22. Elongated lever 20 is mounted to an extension of housing 24 on a pin 50 which acts as a pivot or fulcrum around which the rightwardly extending, hand-engaging portion of lever 20 may rotate downward in the direction shown by the arrow toward the hand grip 22 when squeezed by the rider's hand. Cable 30 is received within tube 40 and extends through tube end 38 into housing 24 where cable end 28 (FIG. 1) connects to lever portion 26 adjacent fulcrum 50 and opposite the hand-engaging end of lever 20.

In the present invention, instead of having exposed cable openings 34, 36 in housing upper surface 32 as shown in FIG. 1, these openings are now substantially covered by cable cover 42 which extends from end portion 26 of lever 20. Cable cover 42 shields the opening in the surface 32 of housing 24 and restricts view of cable 30 therein. Cable cover 42 may be integral and unitary with lever 20 (i.e., made from the same material), or may be a separate piece which is attached or secured to the control lever. For example attachment may be by an adhesive 52 at the interface of the upper surface of control lever end 26 and the lower side of cable cover end 44 (which extends over lever end 26) or by a mechanical fastener 46, e.g., a screw or rivet. To retrofit the cable cover to existing control levers, the cable cover end 44 should be configured to conform to lever portion 26 for facile securing. Cable cover 42 is preferably substantially planar and is more preferably made from some material, e.g. aluminum or stainless steel or chrome plated plastic or metal, which matches the decoration of the adjacent components on the handle bars.

In its preferred embodiment, in operation the cable cover normally shields the housing opening when the control lever 20 is in its normal, unengaged position. However, when the control lever is moved downward, in the direction shown by the right arrow in FIG. 3, to position 20a to move the cable and engage the clutch, the cable cover simultaneously moves upward to position 42a, in the direction shown by the left arrow, to permit access to the cable and the housing. This facilitates replacement, repair or cleaning within the housing without disassembly of the component.

Thus the present invention achieves the objects stated above. The present invention provides a cover for clutch or brake levers which protects the clutch or brake cables attached thereto and restricts the view of the cable attachment to the lever. The cover provides access to the cable when desired, and may be readily retrofitted to existing clutch or brake levers.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A control lever assembly for controlling a cable comprising:
    a cable housing having an outer surface, said outer surface containing an opening for receiving a cable;
    a cable received within said housing;
    a control lever, adjacent said housing, movable to actuate said cable; and
    a cable cover, secured to said control lever, shielding the opening in the surface of said housing and restricting view of the cable therein,
    said control lever being movable between a first position wherein said cable cover shields the opening in the surface of said housing and restricts view of the cable therein and a second position wherein said cable cover is raised from said surface and permits access to the cable in the housing.

2. The assembly of claim 1 wherein said cable cover is adhered or fastened to said control lever.

3. The assembly of claim 1 wherein said control lever has a fulcrum adjacent said housing and wherein said cable cover is attached to said control lever adjacent said fulcrum.

4. The assembly of claim 1 wherein said control lever has a fulcrum adjacent said housing, and a lever portion extending in one direction from said fulcrum and said cable cover extending in an opposite direction from said fulcrum.

5. The assembly of claim 1 wherein said cable cover is substantially planar.

6. The assembly of claim 1 wherein said opening in the housing surface comprises a slot for replacing said cable.

7. The assembly of claim 1 further comprising a handle extending from said housing, said control lever being movable toward and away from said handle.

8. In a control lever assembly having a cable housing having an outer surface, said outer surface containing an opening for receiving a cable; a cable received within said housing; and a control lever, adjacent said housing, movable to actuate said cable, the improvement comprising a cover extending from said control lever shielding the opening in the surface of said housing and restricting view of the cable therein, said control lever being movable between a first position wherein said cable cover shields the opening in the surface of said housing and restricts view of the cable therein and a second position wherein said cable cover is raised from said surface and permits access to the cable in the housing.

9. The assembly of claim 8 wherein said control lever has a fulcrum adjacent said housing and wherein said cable cover extends from said control lever adjacent said fulcrum.

10. The assembly of claim 9 wherein said control lever has a fulcrum adjacent said housing, and a lever portion extending in one direction from said fulcrum and said cable cover extending in an opposite direction from said fulcrum.

11. The assembly of claim 10 wherein said cable cover is substantially planar.

12. The assembly of claim 10 wherein said opening in the housing surface comprises a slot for replacing said cable.

13. The assembly of claim 10 further comprising a handle extending from said housing, said control lever being movable toward and away from said handle.

14. The assembly of claim 13 wherein said cable cover is adhered to said control lever.

* * * * *